(12) United States Patent
Eagles et al.

(10) Patent No.: US 7,669,396 B2
(45) Date of Patent: Mar. 2, 2010

(54) TIMING CRANK AND CYLINDRICAL CONVEYOR FOR AN AGRICULTURAL HARVESTER

(75) Inventors: John O. Eagles, East Moline, IL (US); Duane J. Gosa, Colona, IL (US)

(73) Assignee: Deere & Company, Moline, IL (US)

( * ) Notice: Subject to any disclaimer, the term of this patent is extended or adjusted under 35 U.S.C. 154(b) by 364 days.

(21) Appl. No.: 11/844,052

(22) Filed: Aug. 23, 2007

(65) Prior Publication Data

US 2009/0050447 A1 Feb. 26, 2009

(51) Int. Cl.
*A01D 34/00* (2006.01)

(52) U.S. Cl. ....................................................... 56/153

(58) Field of Classification Search ................ 56/1, 56/10.1, 14.7, 52–65, 74, 86, 91–96, 500–505, 56/122, 153, 192–194, 229, 364
See application file for complete search history.

(56) References Cited

U.S. PATENT DOCUMENTS

| 3,886,718 | A  | * | 6/1975 | Talbot ........................... 56/208 |
| 6,044,635 | A  | * | 4/2000 | Goering et al. ................. 56/34 |
| 7,401,457 | B2 | * | 7/2008 | Bich et al. ...................... 56/294 |
| 7,426,819 | B2 | * | 9/2008 | Bich et al. ...................... 56/364 |
| 7,587,885 | B2 | * | 9/2009 | Tippery et al. ................. 56/14.5 |
| 7,591,127 | B1 | * | 9/2009 | Stacer et al. .................... 56/12.9 |

* cited by examiner

*Primary Examiner*—Robert E Pezzuto

(57) ABSTRACT

A timing crank for a cylindrical conveyor of an agricultural harvester is provided that includes a unitary body in the form of an elongate member with a first end and a second end, wherein the first end defines a first aperture having a first longitudinal axis, wherein the second end defines a second aperture having a second longitudinal axis, wherein each of the apertures are joined by a longitudinal slot extending between and being in communication with the first and second apertures.

6 Claims, 3 Drawing Sheets

TIMING CRANK AND CYLINDRICAL CONVEYOR FOR AN AGRICULTURAL HARVESTER

FIELD OF THE INVENTION

This invention relates to agricultural harvesters. More particularly it relates to cylindrical conveyors for headers in agricultural harvesters.

BACKGROUND OF THE INVENTION

Agricultural harvesters typically include a self-propelled vehicle including crop threshing, separating, or cleaning equipment, and a header attached to the front of the vehicle that the vehicle carries through the field. The header cuts the crop and conveys it to the center of the header using belt or auger conveyors. A second, central cylindrical conveyor is located in the center of the header, typically configured as a cylinder with outwardly extending fingers. The fingers engage the cut crop matter and pull it rearward under the cylinder of the cylindrical conveyor and into the self-propelled vehicle.

In a cylindrical conveyor design, the outwardly extending fingers are not fixed to the outer surface of the cylinder, but are supported at one end on a timing crank that is disposed inside the cylinder, which is hollow. The fingers extend through apertures formed in the cylindrical wall of the cylinder. As the cylinder is driven in rotation about its central longitudinal axis, it drives the fingers in a circular path about the longitudinal axis of an offset shaft that is supported by the timing crank.

The timing crank and the offset shaft that it supports are offset from the longitudinal axis of the central conveyor cylinder. This offset makes the fingers alternately extend from and retract into the cylinder as the cylinder rotates and drives the fingers in their circular path.

The timing crank is typically offset toward the front of the cylinder (and hence the front of the harvester) to permit the fingers to extend farther outward and forward when first engaging the cut crop material. As the cylinder rotates, the fingers pull the cut crop material downward and underneath the cylinder, across a pan or floor, and toward the self-propelled vehicle. Once the cut crop material has been drawn underneath the cylinder, the offset relationship causes the fingers to withdraw into the cylinder, thereby releasing the cut crop material and permitting it to leave the header and be drawn into the self-propelled vehicle for threshing, separating, and cleaning.

The central cylindrical conveyor is preferably configured to be disassembled for cleaning and repair. Part of this disassembly includes removal of the timing crank.

A particular problem for cylindrical conveyors in agricultural environments is the possibility of unwanted rocks or other field trash being drawn into the conveyor. When the fingers engage this material, it places a very high stress on the fingers, which is transferred to the timing cranks which support them.

What is needed, therefore, is a timing crank, conveyor and header that are better able to resist these large stresses. It is an object of this invention to provide such an timing crank, conveyor and header.

SUMMARY OF THE INVENTION

In accordance with a first aspect of an invention, a timing crank for a cylindrical conveyor of an agricultural harvester is provided that includes an elongate body with a first end and a second end, wherein the first end defines a first aperture having a first longitudinal axis, wherein the second end defines a second aperture having a second longitudinal axis, wherein each of the apertures are joined by a longitudinal slot extending between and being in communication with the first and second apertures.

The first and second apertures may not be broken by slots that extend externally to an outer surface of the timing crank. The first and second apertures may not be in communication with the outer surface of the timing crank. The first and second apertures may have first and second interior surfaces, respectively, and the first and second interior surfaces may be faceted. A third aperture may be defined in the timing crank between the first and second apertures and generally at a right angle thereto, and the third aperture may be configured to receive a threaded fastener that tends to close the longitudinal slot when tightened. The first aperture may be configured to be fixed to a central shaft of the cylindrical conveyor, and the second aperture may be configured to be fixed to an offset shaft of the central conveyor, and further wherein the timing crank is configured to hold the longitudinal axes of the central shaft and the offset shaft in a parallel relationship.

In accordance with the second aspect of the invention of cylindrical conveyor of an agricultural harvester is provided that includes a hollow conveyor cylinder having a center and a central rotational axis; a plurality of conveyor fingers extending through apertures on the hollow conveyor cylinder; an offset shaft having a longitudinal axis that is elongate and has two opposing ends, and to which the plurality of fingers are coupled for free rotation, the offset shaft being disposed inside the hollow conveyor cylinder and offset from the central rotational axis, wherein the longitudinal axis is parallel to the central rotational axis; first and second central shafts disposed inside the hollow conveyor cylinder and coaxial with the central rotational axis of the hollow conveyor cylinder; two timing cranks fixed to the first and second central shafts and to the opposing ends of the offset shaft, wherein each of said two timing cranks is an elongate unitary body having a first end and a second end, wherein the first end defines a first aperture in the unitary body with a first longitudinal axis, wherein the second end defines a second aperture in the unitary body with a second longitudinal axis, and further wherein each of the apertures are joined by a longitudinal slot extending between and being in communication with the first and second apertures.

The first and second apertures may not be broken by slots that extend externally to an outer surface of the timing crank. The first and second apertures may not be in communication with the outer surface of the timing crank. The first and second apertures may have first and second interior surfaces, respectively, and the first and second interior surfaces may be faceted. A third aperture may be defined in the timing crank between the first and second apertures and generally at a right angle thereto, and the third aperture may be configured to receive a threaded fastener that tends to close the longitudinal slot when tightened. The first aperture may be configured to be fixed to a central shaft of the cylindrical conveyor, and the second aperture may be configured to be fixed to an offset shaft of the central conveyor, and the timing crank may be configured to hold the longitudinal axes of the central shaft and the offset shaft in a parallel relationship.

BRIEF DESCRIPTION OF THE DRAWINGS

FIG. 3 is a prior art timing crank having two apertures in communication with the outside surface of the timing crank in side view to.

DESCRIPTION OF THE PREFERRED EMBODIMENT

Figure 1:
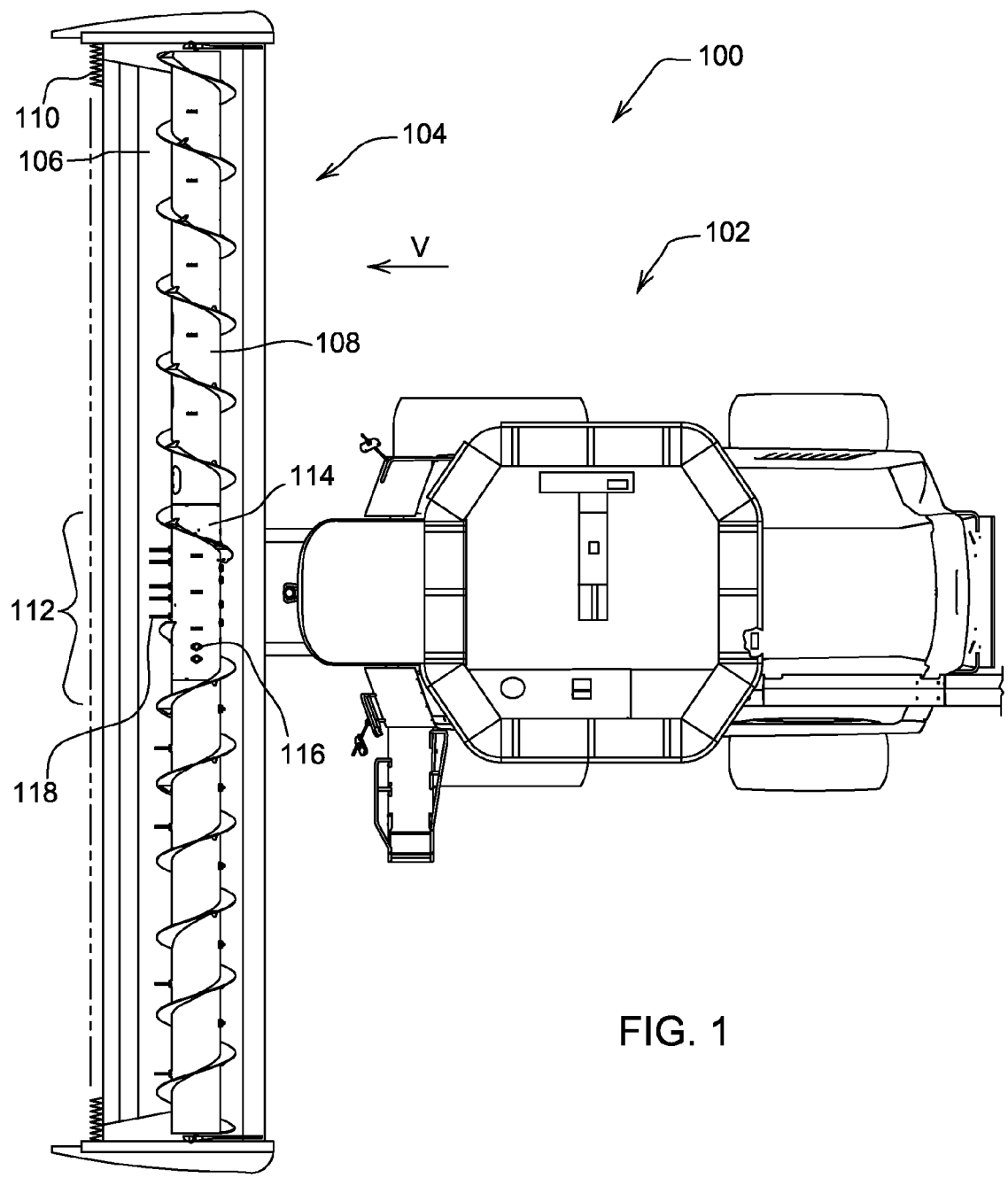
FIG. 1 is a perspective view of an agricultural harvester having a typical cylindrical conveyor.

Referring now to FIG. 1, an agricultural harvester 100 can be seen which comprises a self-propelled vehicle 102 and a header 104 mounted on the front of the self-propelled vehicle. The header comprises a platform 106 which supports a cylindrical conveyor 108 and a cutter bar 110 that both extend laterally across the width of the header. The cutter bar is configured to sever the crop plants from the ground, and the cylindrical conveyor 108 is configured to rotate about its longitudinal axis and thereby convey this cut crop material to the lateral midpoint of the header.

A central portion 112 of cylindrical conveyor 108 includes a hollow cylinder portion 114 with apertures 116 through which a plurality of fingers 118 extend. Fingers on the conveyor pull the cut crop material rearward and through an aperture (not shown) in the back sheet of the header whereupon it is received by the vehicle 102. Equipment (not shown) disposed in vehicle 102 then threshes, separates and cleans the cut crop material.

Figure 2:
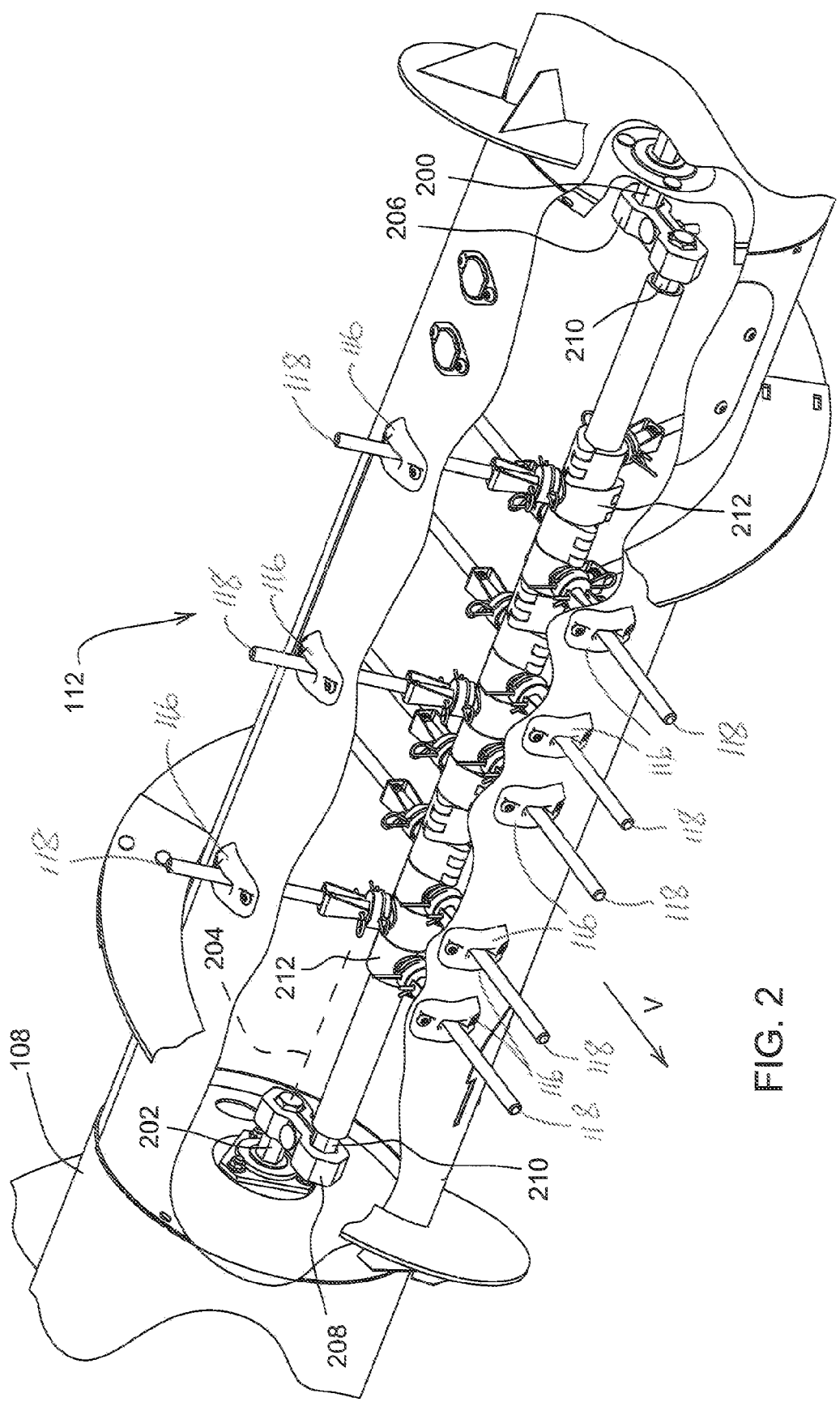
FIG. 2 is a fragmentary detail view of the central portion of the header of FIG. 1 with part of the cylinder removed. A timing crank on which fingers are mounted is shown inside the cylinder.

In reference to FIG. 2, central portion 112 of cylindrical conveyor 108 has been cut away to show two central shafts 200, 202 that extend laterally inward from the left and the right ends of the cylindrical conveyor 108, respectively, to central portion 112. Central shafts 200, 202 share a common longitudinal axis 204 with each other and with cylindrical conveyor 108. Central shafts 200, 202 are fixed at their outer ends so they do not rotate during operation. Instead, cylindrical conveyor 108 is driven at one or both ends to rotate about shafts 200, 202.

Two timing cranks 206, 208 are fixed to the inner ends of central shafts 200, 202, respectively. Timing cranks 206, 208 extend generally forward from central shafts 200, 202 in the direction of travel "V" (of the vehicle. Both timing cranks 206, 208 are fixed to the ends of an offset shaft 210 that extends between them.

Several finger mounts 212 are fixed to offset shaft 210 and support the inner ends of fingers 118 on shaft 210. Finger mounts 212 are configured to permit fingers 118 to rotate freely about offset shaft 210 as cylindrical conveyor 108 rotates. Since offset shaft 210 is offset from the central longitudinal and rotational axis 204 of cylindrical conveyor 108, the fingers alternately extend from and retract into cylindrical conveyor 108 as cylindrical conveyor 108 rotates, as a function of their rotational position with respect to offset shaft 210.

The timing cranks are subjected to severe loads as the cylinder 108 rotates. Large objects such as rocks, branches, and sticks are occasionally drawn into the cylindrical conveyor 108. When this happens, fingers 118 may engage these objects and apply very large responsive forces to offset shaft 210 and timing cranks 206, 208. These large forces can damage timing cranks 206, 208.

Figure 3:
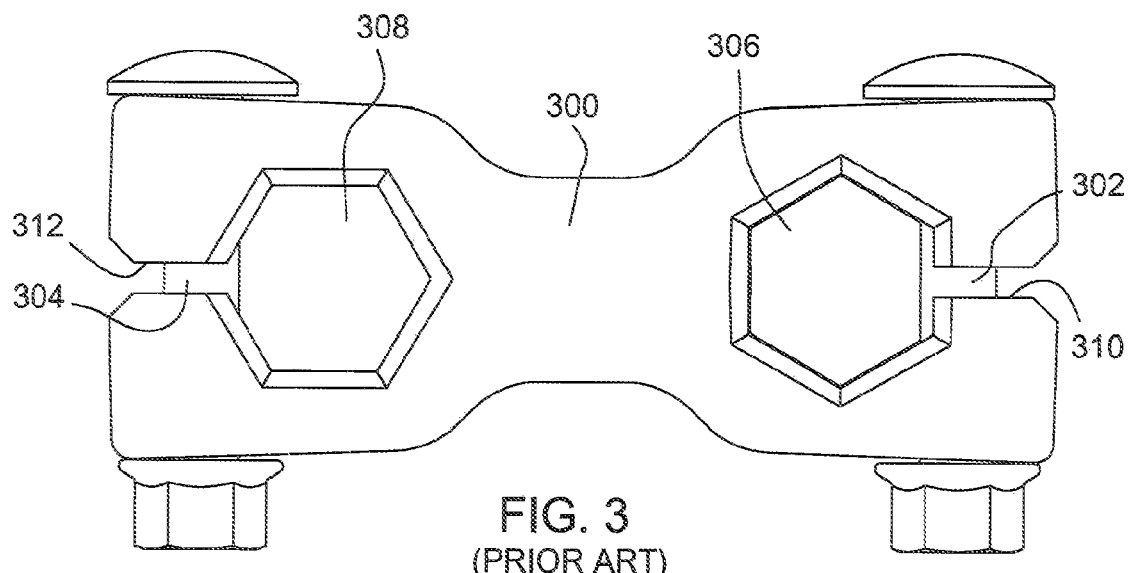

In reference to FIG. 3, prior art timing cranks 300 were provided with two threaded fasteners 302, 304 to fix the offset shaft to the central shafts.

The fasteners 302, 304 are disposed at each end of the timing crank 300. in this arrangement, the fasteners 302, 304 are separately tightened to fix the timing crank 300 to shafts 200, 202, 210. Considered from the side view of FIG. 3, two slots 310, 312 extend from an outer surface of timing crank 300 into each of the apertures 306, 308. These slots place apertures 306, 308 in communication with the outside surface of timing crank 300 in side view, as shown in FIG. 3.

As bolts 302, 304 are tightened, the material around slots 310, 312, is deformed inwardly to close the slots 310, 312 and fix the prior art timing crank 300 to shafts 200, 202, 210. This applies a bending moment to the heads of the bolts. This bending moment causes greater stress and strain on one side of the bolt than on the other side of the bolt, which can lead to bolt failure under high loads, such as when the fingers engage a rock or branch embedded in the cut crop material.

Figure 4:
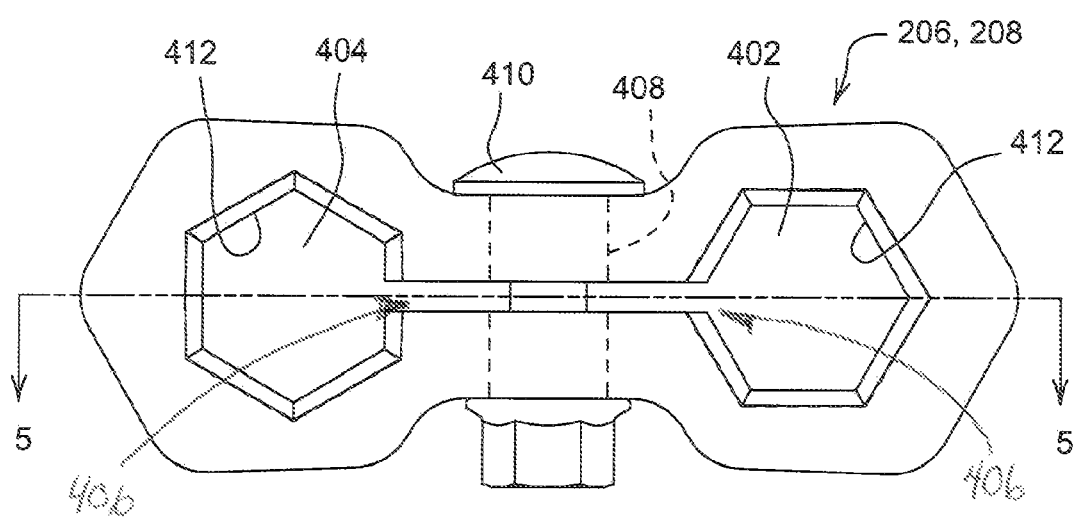
FIG. 4 is a side view of the timing crank of FIG. 2.
Figure 5:
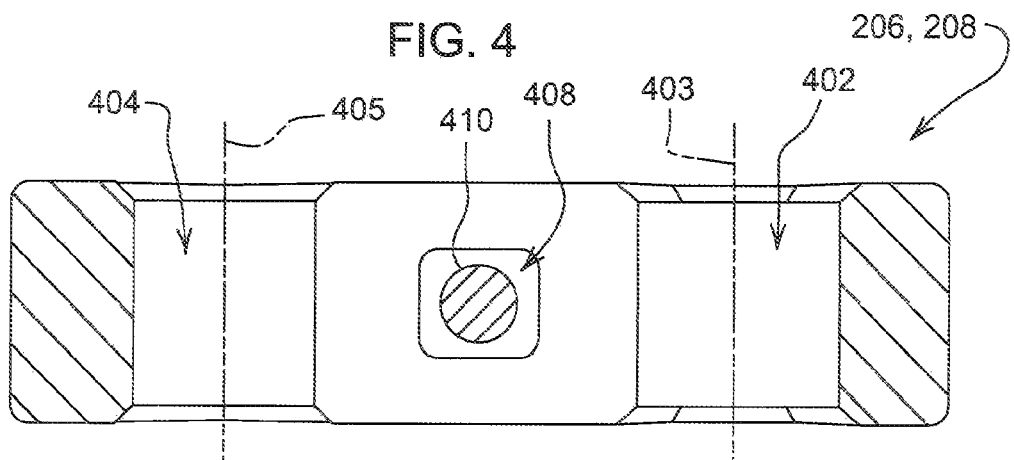
FIG. 5 is a cross-sectional view of the timing crank of FIGS. 1, 2 and 4 taken at section line 5-5 in FIG. 4.

Timing cranks 206, 208 in accordance with the present invention are illustrated in FIGS. 4-5. Timing cranks 206, 208 are in the form of an elongate member defining first and second apertures 402, 404 that are disposed at first and second ends of the member. First and second apertures 402, 404 extend through the member and are configured to receive and be fixed to shafts 200, 202, 210. First and second apertures 402, 404 have longitudinal axes 403, 405 that are parallel and are configured to hold the shafts 200, 202, 210 in a parallel relationship to one another.

A slot 406 extends between, and is in communication with, both the apertures 402, 404, defining a closed shape that is not in communication with the outside surface of the timing crank 206, 208 in either embodiment. The apertures 402, 404 of timing crank 206, 208 are not in communication with the outer surface of the timing crank in side view. Referring to the side view of FIG. 4 and comparing it to the side view of FIG. 3, apertures 402, 404 are not broken with a slot that extends between the outer surface of timing crank 206, 208 and apertures 402, 404, unlike apertures 306, 308 of timing crank 300 which are broken by slots 310, 312 that extend externally to the outer surface of timing crank 300 in side view.

To fix the timing cranks 206, 208 to shafts 200, 202, 210, a third aperture 408 and threaded fastener 410 are provided for each timing crank. Third aperture 408 extends through the elongate member in a direction generally perpendicular to slot 406. Third aperture 408 is configured to receive a threaded fastener 410 that draws opposite sides of slot 406 together when tightened, reducing the size of first and second apertures 402, 404 and seizing them to shafts 200, 202, 210 that are received in apertures 402, 404.

Third aperture 408 is preferably disposed in the middle of timing crank 206, 208, equidistant from each of first and second apertures 402, 404, and at right angles to first and second apertures 402, 404. In this manner, when the threaded fastener 410 is tightened, no net bending moment is applied to the head of the fastener, and thus the risk that the fastener will be broken is reduced.

First and second apertures 402, 404 are preferably polygonal in side view (FIG. 4) and have facets 412 of equal size that are disposed equiangularly about the longitudinal axis 403, 405 of first and second apertures 402, 404, respectively.

Central shafts 200, 202 and offset shaft 210, are regular hexagons in cross-section and therefore have facets (FIG. 2) that match the facets 412 of apertures 402, 404, being formed with the same number of facets and with the same dimensions between and across the facets as first and second apertures 402, 404 in which they are inserted. An interference fit or slight running clearance is provided between shafts 200, 202, 210 and apertures 402, 404. When threaded fastener 410 is tightened, the facets on the inside of apertures 402, 404, and the facets on the outside surface of shafts 200, 206 engage each other to mechanically prevent relative rotation of shafts 200, 202, 210 with respect to the timing cranks 206, 208. Having described the preferred embodiment, it will become apparent that various modifications can be made without departing from the scope of the invention as defined in the accompanying claims. For example, the facets may be replaced with other anti-rotation devices commonly used between shafts and the apertures that receive them, such as splines keys or the like. More or fewer facets may be provided on the shafts and their mating apertures. The third aperture 408 may be closer to one end than the other. More than one third aperture may be provided and may receive more than one threaded fastener.

We claim:

1. A cylindrical conveyor of an agricultural harvester, comprising:
    a hollow conveyor cylinder having a center and a central rotational axis;
    a plurality of conveyor fingers extending through apertures on the hollow conveyor cylinder;
    an offset shaft having a longitudinal axis that is elongate and has two opposing ends, and to which the plurality of fingers are coupled for free rotation, the offset shaft being disposed inside the hollow conveyor cylinder and offset from the central rotational axis, wherein the longitudinal axis is parallel to the central rotational axis;
    first and second central shafts disposed inside the hollow conveyor cylinder and coaxial with the central rotational axis of the hollow conveyor cylinder; and
    two timing cranks fixed to the first and second central shafts and to the opposing ends of the offset shaft, wherein each of said two timing cranks is an elongate unitary body having a first end and a second end, wherein the first end defines a first aperture in the unitary body with a first longitudinal axis, wherein the second end defines a second aperture in the unitary body with a second longitudinal axis, and further wherein each of the apertures are joined by a longitudinal slot extending between and being in communication with both the first and second apertures.

2. The cylindrical conveyor of claim 1, wherein the first and second apertures are not broken by slots that extend externally to an outer surface of the timing crank.

3. The cylindrical conveyor of claim 1, wherein the first and second apertures are not in communication with an outer surface of the timing crank.

4. The cylindrical conveyor of claim 1, wherein the first and second apertures have first and second interior surfaces, respectively, and further wherein the first and second interior surfaces are faceted.

5. The cylindrical conveyor of claim 1, wherein a third aperture is defined in the timing crank between the first and second apertures and generally at a right angle thereto, wherein the third aperture is configured to receive a threaded fastener that tends to close the longitudinal slot when tightened.

6. The cylindrical conveyor of claim 1, wherein the first aperture is configured to be fixed to a central shaft of the cylindrical conveyor, wherein the second aperture is configured to be fixed to an offset shaft of the central conveyor, and further wherein the timing crank is configured to hold the longitudinal axes of the central shaft and the offset shaft in a parallel relationship.

* * * * *